May 25, 1971
P. KOCH
3,580,760
PROCESS OF MAKING LAMINATED WOOD PRODUCT UTILIZING
MODULUS OF ELASTICITY MEASUREMENT
Filed May 29, 1969
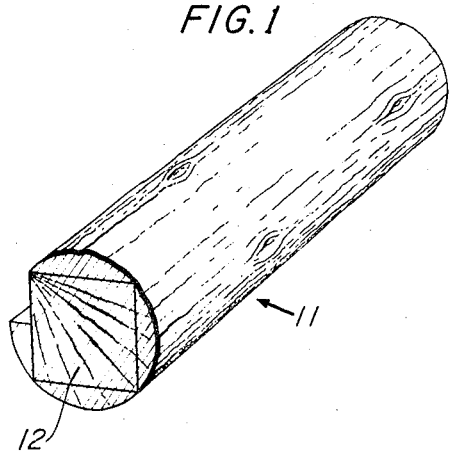
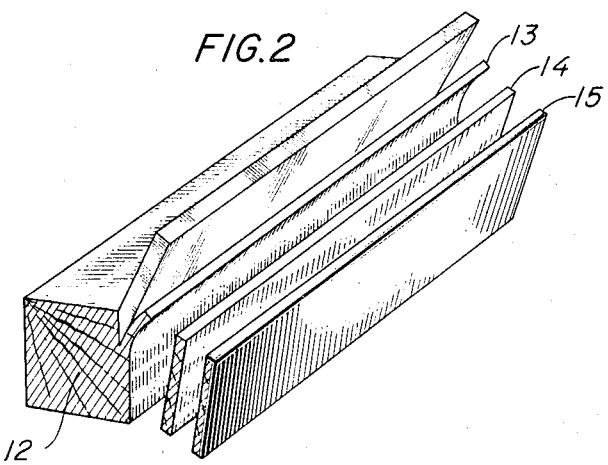
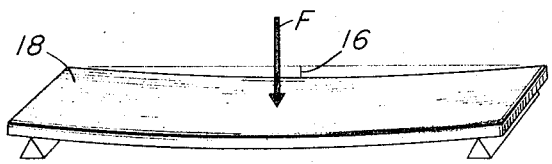
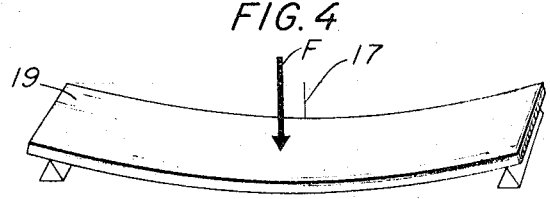
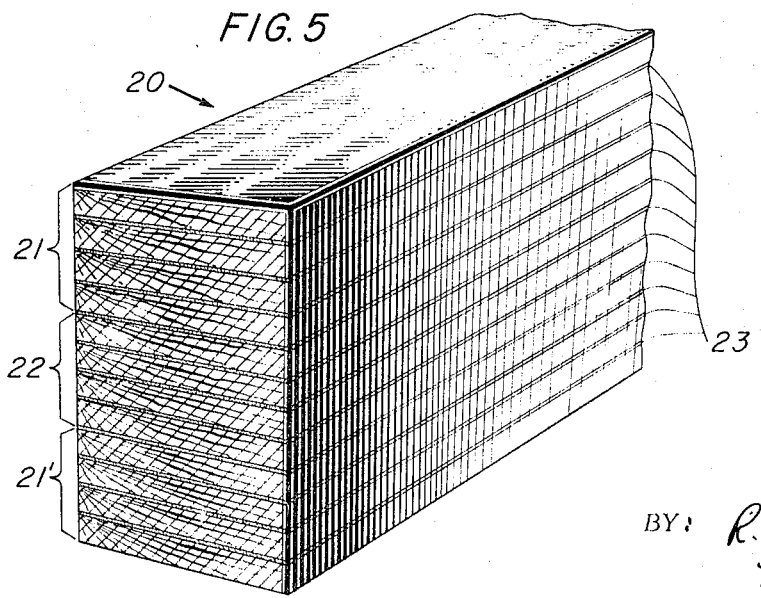
INVENTOR.
PETER KOCH
BY: R. Hoffman
W. Bier
ATTORNEYS United States Patent Office 3,580,760
Patented May 25, 1971

3,580,760
PROCESS OF MAKING LAMINATED WOOD PRODUCT UTILIZING MODULUS OF ELASTICITY MEASUREMENT
Peter Koch, Alexandria, La., assignor to the United States of America as represented by the Secretary of Agriculture
Continuation-in-part of application Ser. No. 429,175, Jan. 29, 1965. This application May 29, 1969, Ser. No. 829,103
Int. Cl. G01b 5/00
U.S. Cl. 156—64
3 Claims

ABSTRACT OF THE DISCLOSURE

This invention relates to a process for producing laminated structures, and more specifically laminated beams, whereby the entire product of logs or bolts of wood is utilized, regardless of the presence of undesirable properties inherent in the lumber cut from said logs or bolts. Laminae are obtained from the logs by any convenient cutting method, dried to a low moisture content, relatively graded according to their deflection under a standard load at their center while supported near their end points, then arranged into a laminated structure with those laminae that have the greatest deflection in the center of the structure and those with progressively less deflection located away from the center such that the least deflective laminae are furthest from the center of the structure, and the laminae are then bonded by an adhesive.

A nonexclusive, irrevocable, royalty-free license in the invention herein described, throughout the world for all purposes of the United States Government, with the power to grant sublicenses for such purposes, is hereby granted to the government of the United States of America.

CROSS REFERENCE TO RELATED APPLICATION

This application is a continuation-in-part of application Ser. No. 429,175, filed Jan. 29, 1965, now abandoned.

BACKGROUND OF THE INVENTION (1) Field of the invention

This invention relates to laminated structures, with particular reference to the process of fabricating laminated wood beams.

(2) Description of prior art

To the best of the inventor's knowledge the process for making laminated wood beams herein claimed has not been used before. Boltwood, such as southern pine, is in abundant supply, but its use for structural purposes is limited because of undesirable qualities inherent in the lumber cut from each bolt. Boltwood contains relatively high proportions of juvenile wood, which is relatively weak and exhibits excessive longitudinal shrinkage properties. The compression wood in some boltwood causes extreme drying distortion. These factors, along with the small size of obtainable structural lumber from each bolt, make the effective utilization thereof impossible when conventional means are employed.

Accordingly, this invention has for one of its objects the structural utilization of the entire boltwood product. Another object of this invention is a process which allows the production of structural beams of any desired length and thickness, irrespective of the initial size of each bolt. A further object of this invention is the provision of a method of fabricating high strength laminates from boltwood which is ordinarily considered as a nonstructural material. A still further object of this invention is the provision of a laminate which is stronger and stiffer than an unlaminated structure or a structure laminated in a conventional manner. The foregoing and other objects which will become apparent to those skilled in the art will appear in the following description and appended claims.

SUMMARY

The essence of this invention which renders the aforesaid objects capable of accomplishment resides in the arrangement of the laminae with respect to their modulus of elasticity in a laminated product; the laminae with the higher modulus of elasticity being located in the outer and extreme layers therein, and the laminae with the lower modulus of elasticity being located in the center and inner layers therein. Accordingly, the invention discloses a laminated structure in which the laminae are arranged so there is a progressive increase in the modulus of elasticity of each successive lamina from the center to the outer surface of the structure. In general, after the laminae are cut to the desired thickness and length, and arranged by modulus of elasticity in the above manner, they are bonded together with an adhesive to form a laminated beam.

BRIEF DESCRIPTION OF THE DRAWING

Referring to the accompanying drawing:
FIG. 1 is a perspective view of a typical log or bolt being prepared for the cutting of laminae.
FIG. 2 is a perspective view showing laminae being prepared from a cant cut from the logs or bolts.
FIGS. 3 and 4 are perspective views of laminae being tested to determine their stiffness (modulus of elasticity).
FIG. 5 is a perspective view of a typical beam laminated according to the invention.

DESCRIPTION OF THE PREFERRED EMBODIMENTS

Referring to FIG. 1, a cant 12 is first cut from a log or bolt 11. Laminae, generally indicated by 13, 14, and 15 in FIG. 2 are then prepared from the cant 12, by slicing, as illustrated in FIG. 2, sawing, or any other convenient manner. The thickness of each lamina may range from about one-sixteenth to two inches, although the process herein described is especially suited to a maximum lamina thickness permissible from either rotary peeling or slicing, which is about from one-fourth to five-eighths inch. The thus prepared laminae are then dried to a moisture content of about from five to ten percent.

The laminae are then segregated into a graded series according to modulus of elasticity which can be accomplished for the equal thickness lamina shown by measuring the deflection of each lamina under a given weight. For example, referring to FIGS. 3 and 4, each lamina is supported at its ends and flexed by imposing a given force, indicated by F, on the center of said lamina, thus causing measurable deflections, as indicated by 16 and 17. According to this particular method of modulus of elasticity testing, the higher modulus of elasticity laminae indicated by 18 will be deflected less, as seen by comparing deflection amounts 16 and 17, than the more limber laminae indicated by 19, and each piece may be assigned a comparative deflection value which is inversely proportional to its modulus of elasticity. However, it is not intended that this particular method of testing be a limitation on the present invention since any nondestructive method of testing comparative modulus of elasticity may be employed. If unequal thickness laminae are used suitable tests to determine modulus of elasticity directly must be employed.

It will be seen that laminae produced from a single bolt or log and therefore a single species of wood will exhibit a substantial disparity in modulus of elasticity. The uniting concept of this invention is the effective utilization of substantially all pieces obtainable from a single bolt or log in a composite laminated structure by arranging each lamina in relation to other laminae according to modulus of elasticity within said structure.

The laminae are arranged into a composite laminated beam 20 in FIG. 5 by placing the laminae that have a higher modulus of elasticity in the outer portion, indicated generally by 21 and 21' in FIG. 5, and the laminae that have a lower modulus of elasticity in the central portion, indicated generally by 22 in FIG. 5, of said beam. Preferably, the laminae are arranged therein such that laminae that have a progressively higher modulus of elasticity are located from the center of said structure outwardly resulting in a structure which is composed of and utilizes all of the laminae without regard to defect, or at least a larger proportion of juvenile and compression wood than conventional methods would allow. The laminae are then adhered together to any desired thickness by means of an adhesive, shown at 23 in FIG. 5, and allowed to cure.

In the resulting beam, the grain of the wood of each lamina runs parallel, as indicated by 24 in FIGS. 3, 4 and 5, to the span, as shown by 25 in FIG. 5, of the beam. The combination of the selective positioning of the laminae with respect to modulus of elasticity and the grain direction parallel to the span, results in a stiffer and stronger beam than previously thought possible by persons skilled in the art.

In order to produce a beam which is longer than an individual lamina, the laminae may be scarf-jointed or end-spliced such that end structures in the resulting structure are distributed to minimize the weakening effect therein.

The resulting laminated structure with laminae located accordingly to modulus of elasticity is stronger and stiffer than similar structures produced from the same species wherein the laminae are arranged randomly, according to specific gravity, or according to appearance i.e., knot area. The resulting laminated structure is also stronger and stiffer than an unlaminated piece of the same dimensions and the same species of wood of said laminated structure.

Having thus described my invention, I claim:

1. A process for producing a laminated wood product comprising measuring the modulus of elasticity of each of a plurality of laminae of the same wood species, placing the individual lamina in a face to face relationship with one another with adhesive between the layers and with the laminae having a lower modulus of elasticity placed in the central portion of the resulting composite structure and the laminae having a progressively higher modulus of elasticity placed outwardly from said central portion such that the laminae having the highest modulus of elasticity are at the extreme outer portions of the structure, the grain of the wood of each lamina in the structure running parallel to the span of the structure, and allowing the adhesive to cure to form a laminated wood product.

2. The process of claim 1 wherein the laminae are layers of wood cut from any portion across the diameter or along the length of a single wood log.

3. The process of claim 1 wherein the laminae are layers cut from a bolt of southern pine.

References Cited
UNITED STATES PATENTS 2,271,744  2/1942  Nevin ---------------- 156—64
2,656,296  10/1953  Grangaard ----------- 156—64

LELAND A. SEBASTIAN, Primary Examiner

S. J. LECHERT, JR., Assistant Examiner

U.S. Cl. X.R.
156—264